United States Patent [19]

Nishikura et al.

[11] Patent Number: 5,300,851
[45] Date of Patent: Apr. 5, 1994

[54] LINEAR-TYPE ACTUATOR

[75] Inventors: Takahiro Nishikura, Ikoma; Katsu Takeda, Osaka; Masanori Sumihara, Higashiosaka; Osamu Kawasaki, Tsuzuki, all of Japan

[73] Assignee: Matsushita Electric Industrial Co., Ltd., Osaka, Japan

[21] Appl. No.: 969,369

[22] Filed: Oct. 30, 1992

[30] Foreign Application Priority Data

Oct. 31, 1991 [JP] Japan .................................. 3-285919

[51] Int. Cl.⁵ ............................................ H01L 41/08
[52] U.S. Cl. ..................................... 310/328; 310/321; 310/323
[58] Field of Search ...................... 310/328, 323, 321

[56] References Cited

U.S. PATENT DOCUMENTS

| 4,727,278 | 2/1988 | Staufenberg et al. | 310/328 |
| 4,857,793 | 8/1989 | Okuno | 310/328 |
| 5,134,334 | 7/1992 | Onishi et al. | 310/328 |
| 5,182,484 | 1/1993 | Culp | 310/328 |

FOREIGN PATENT DOCUMENTS

| 0077485 | 3/1989 | Japan | 310/323 |
| 2-082164 | 3/1990 | Japan | 310/321 |
| 0262874 | 10/1990 | Japan | 310/323 |
| 4-049873 | 2/1992 | Japan | 310/321 |
| 0614477 | 7/1978 | U.S.S.R. | 310/328 |

Primary Examiner—Mark O. Budd
Assistant Examiner—Thomas M. Dougherty
Attorney, Agent, or Firm—Wenderoth, Lind & Ponack

[57] ABSTRACT

In a linear-type actuator where an elastic wave is excited upon the vibrator composed of a rod shaped elastic member and a piezo member so as to drive the moving member bought into pressure contact upon the vibrator, the present invention provides a linear-type actuator where the improvement of the driving efficiency and the simplification of the driving circuit can be achieved by the new driving principle.

9 Claims, 12 Drawing Sheets

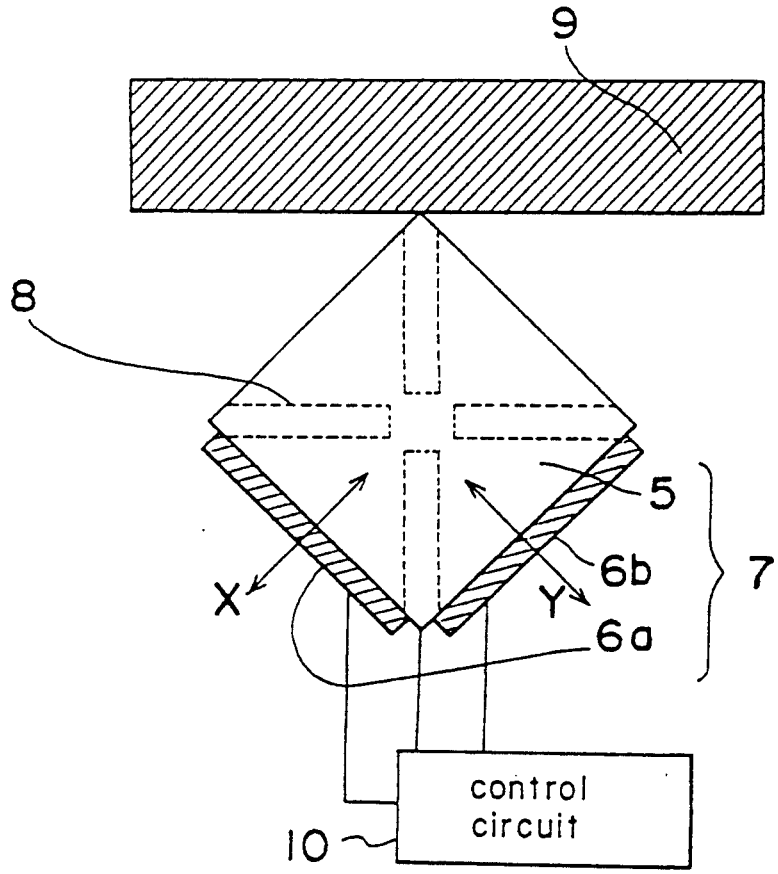

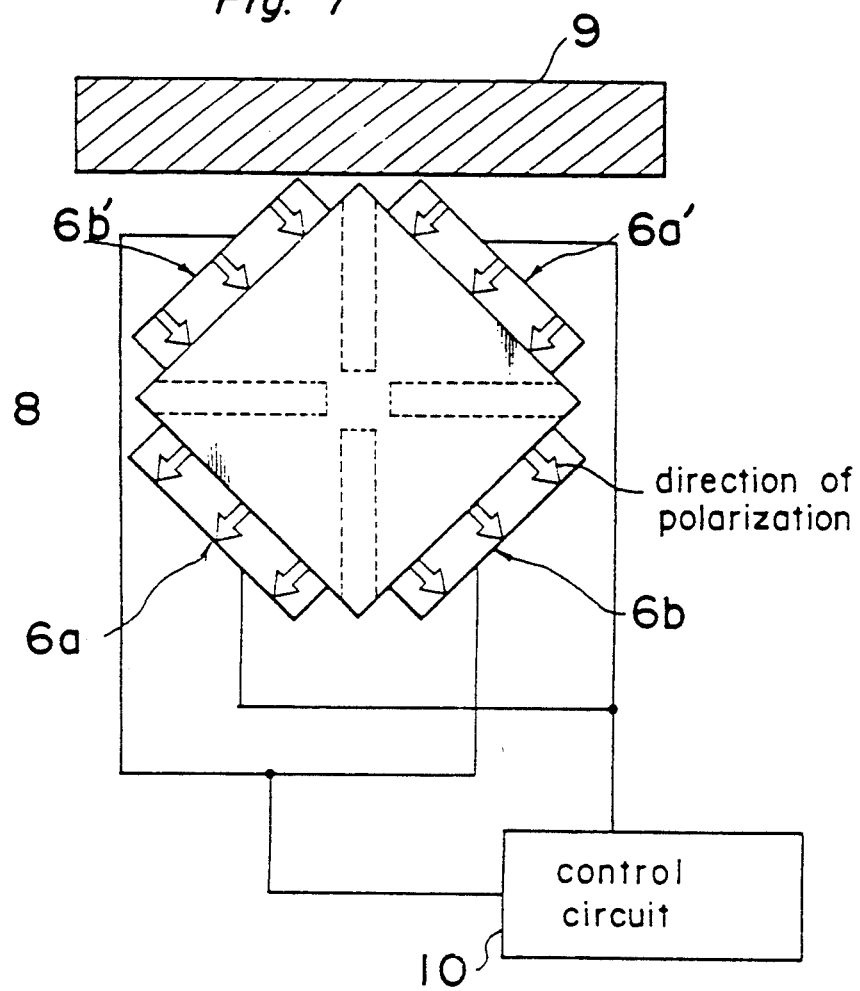

LINEAR-TYPE ACTUATOR

BACKGROUND OF THE INVENTION

The present invention generally relates to the construction of a linear-type actuator for generating driving force with the use of elastic vibrations to be obtained by the piezo-electric effect of a piezo member, and a method of driving it.

In recent years, a linear-type actuator is watched, where elastic vibrations are excited upon the vibrator consisting of a piezo member such as piezo ceramic or the like so as to use them as driving force.

The conventional linear type actuator will be described hereinafter in conjunction with the one shown in FIG. 1.

FIG. 1 is a schematic view of the conventional linear-type actuator shown in Japanese Patent Laid-Open Publication No. 63-283473. Referring now to FIG. 1, there provides integrally a driver member 2 on the one surface of a basic member 3, and a vibrator 1 is composed of piezo elements 4a, 4b, 4c being stuck, as shown in FIG. 2, on three faces except for driving the vibrator 1 on the basic member 3 with the driver member 2 being integrally projected.

The vibrator 1 constructed as mentioned above is excited in the diagonal line E - F or G - H direction of the vibrator 1 of FIG. 1 so that a slider (not shown) which has been brought into pressure contact onto the driving member 2 can be driven. A voltage $V_1$ to be expressed by the (1) equation is applied upon the piezo element 4a, a voltage $V_2$ expressed by the (2) equation is applied upon the piezo elements 4b, 4c.

$$V_1 = V_0 X \sin(\omega t) \quad (1)$$

$$V_2 = V_0 X \cos(\omega t) \quad (2)$$

where $V_0$ is an instantaneous value of a voltage, $\omega$ is a angular frequency, t is time.

Bending vibrations for effecting elliptic movement expressed by the (3) equation are excited upon the driving member 2 of the vibrator 1 at the top end of the driving member 2.

$$\xi = \xi_\theta X (\cos(\omega t) + \sin(\omega t)) \quad (3)$$

where $\xi$ is an amplification value of bending vibrations, $\xi_0$ is an instantaneous value of bending vibrations.

A slider established in pressure contact against the end of the driving member 2 of the vibrator 1 by the movement of the elliptic track by frictional force is driven in the movement direction of the elliptic track by the frictional force. Also, the movement can be effected in a direction opposite to the above description by the change in phase.

In the construction of the conventional linear-type actuator, the bending rigidity of the vibrator in the Y direction to be driven by the piezo member becomes large with providing the driving member 2 to be different from the bending rigidity of the vibrator in the X direction, and the resonance frequency and impedance of the piezo element 4a taken from the side of driving element become largely different from the resonance frequencies and impedances of the piezo members 4b and 4c.

Therefore, even if the voltages v1 and v2 expressing with the equations (1) and (2) are loaded on, the vibration amplitudes in the X and Y directions are different from each other to lower largely the driving efficiency of slider. The driving circuit, the controlling circuit and so on become complicated if the vibration amplitude in the X, Y directions is made to be set in approximately the same extent. As the change in the bonding rigidity by the driving member 2 causes the slip in the node position of the displacement distribution in the X, Y directions due to not specifying the position for supporting the driver member, the vibration loss by the support fixing operation of the vibrator becomes larger so as to reduce the driving efficiency.

Although the moving direction of the slider is changed with the composite resonance by the piezo member provided on an orthogonal plane and the phase of the vibration in the X, Y directions, the efficiency is not expected to be improved, because approximately double inputs are required because of the change in the moving direction. That's why the vibration displacement amount is not increased by the composition of two vibrations.

The driving member and the slider come into contact against each other on the plane, with a problem of lowering the driving efficiency and causing the noises when the plane accuracy is inferior. Further, when the plane accuracy is improved, there is a problem in that the mass production and manufacturing cost increase are caused.

SUMMARY OF THE INVENTION

Accordingly, the present invention has been developed with a view to substantially eliminating the above discussed drawbacks inherent in the prior art, and has for its essential object to provide an improved linear type actuator of causing driving force with the use of the elastic vibrations of the piezo member.

Another important object of the present invention is to provide an improved driving method of using a rod-shaped vibrator of a polygon such as square, triangle or the like in sectional shape, bringing a moving member into pressure contact into the ridge line portion of the polygon, moving the moving member in a certain one direction by the application of the alternating voltage upon one pair of piezo members consisting of the driving member, moving the moving member in an opposite direction by the switching operation of the alternating voltage into the other pairs of piezo members.

BRIEF DESCRIPTION OF THE DRAWINGS

These and other objects and features of the present invention will become apparent from the following description taken in conjunction with the preferred embodiment thereof with reference to the accompanying drawings, in which;

FIG. 6 (b) is a view for illustrating the operation principle in a second piezo member in the first embodiment of the present invention;

FIG. 7 is a view showing an arrangement example of a piezo member in the first embodiment of the present invention;

FIG. 9 (b) is a view for illustrating the operation principle in a second piezo member in the second embodiment of the present invention;

DETAILED DESCRIPTION OF THE INVENTION

Figure 1:
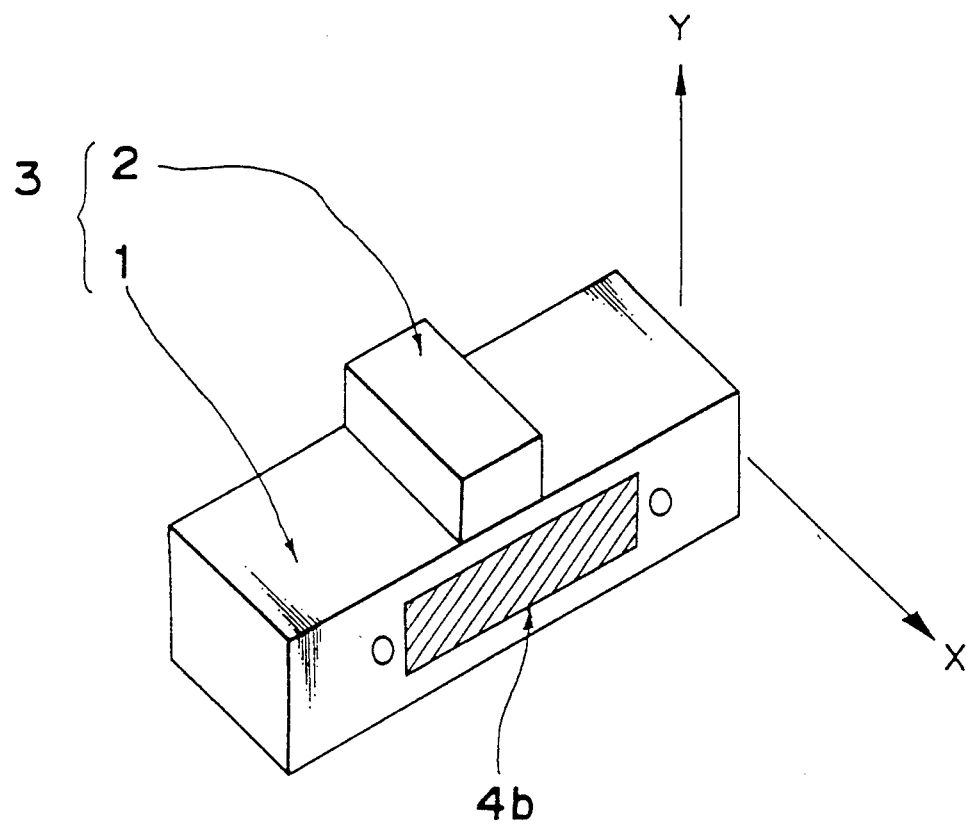
FIG. 1 shows a schematic view showing the construction of the vibrator of the conventional linear-type actuator.
Figure 2:
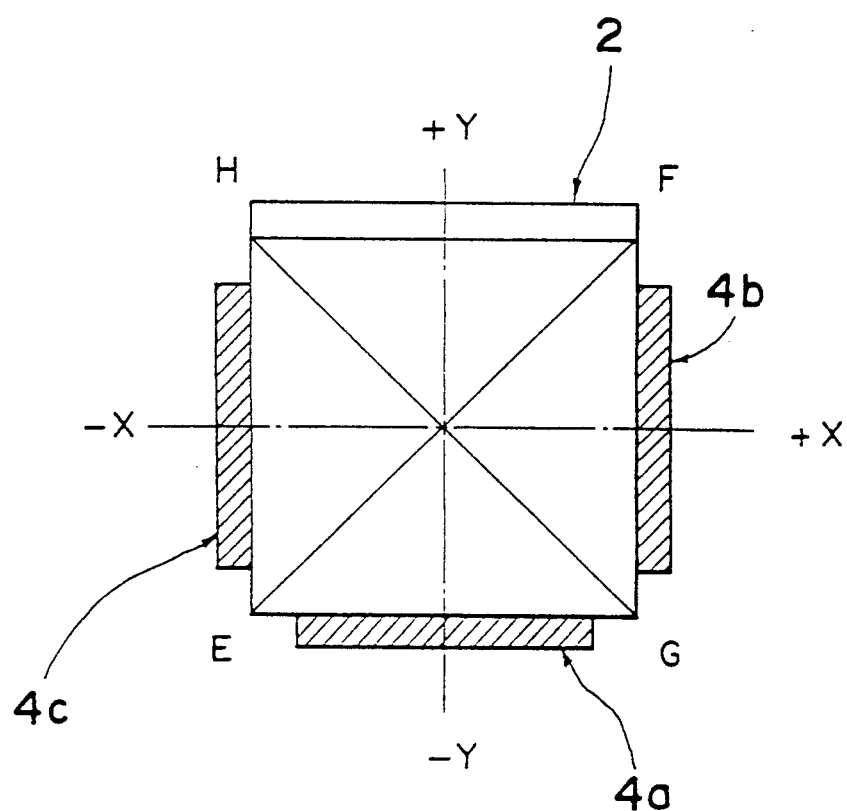
FIG. 2 is a view showing the conventional driving principle.

Before the description of the present invention proceeds, it is to be noted that like parts are designated by like reference numerals throughout the accompanying drawings.

A first embodiment of the present invention will be fully described hereinafter with reference to FIGS. 3 to 7.

Figure 3:
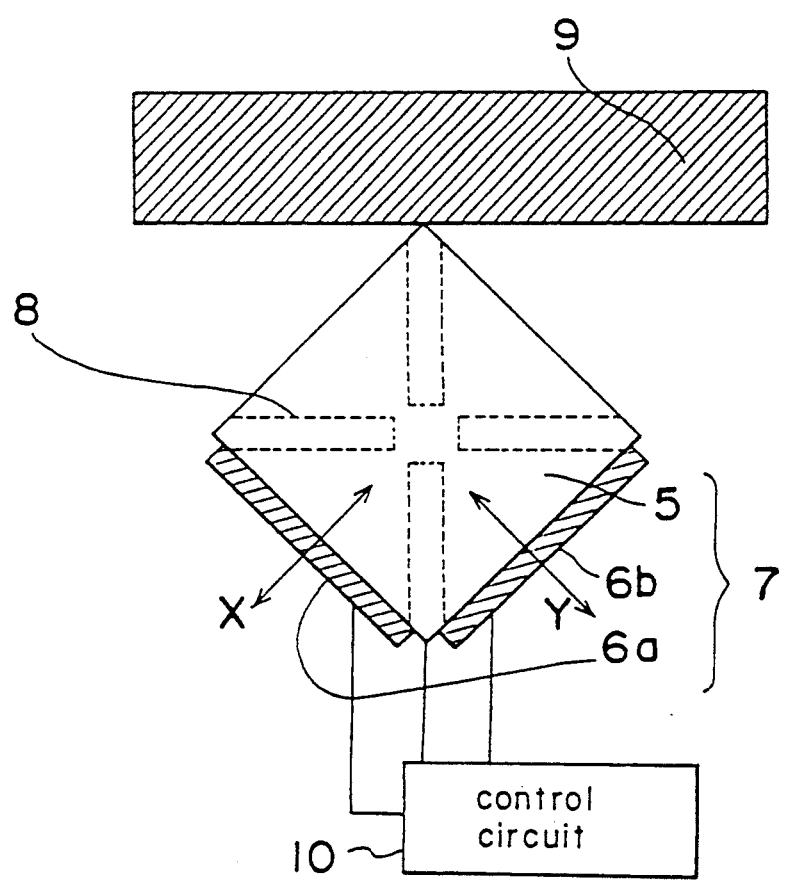
FIG. 3 is a sectional view showing the construction of a linear-type actuator in a first embodiment of the present invention.
Figure 4:
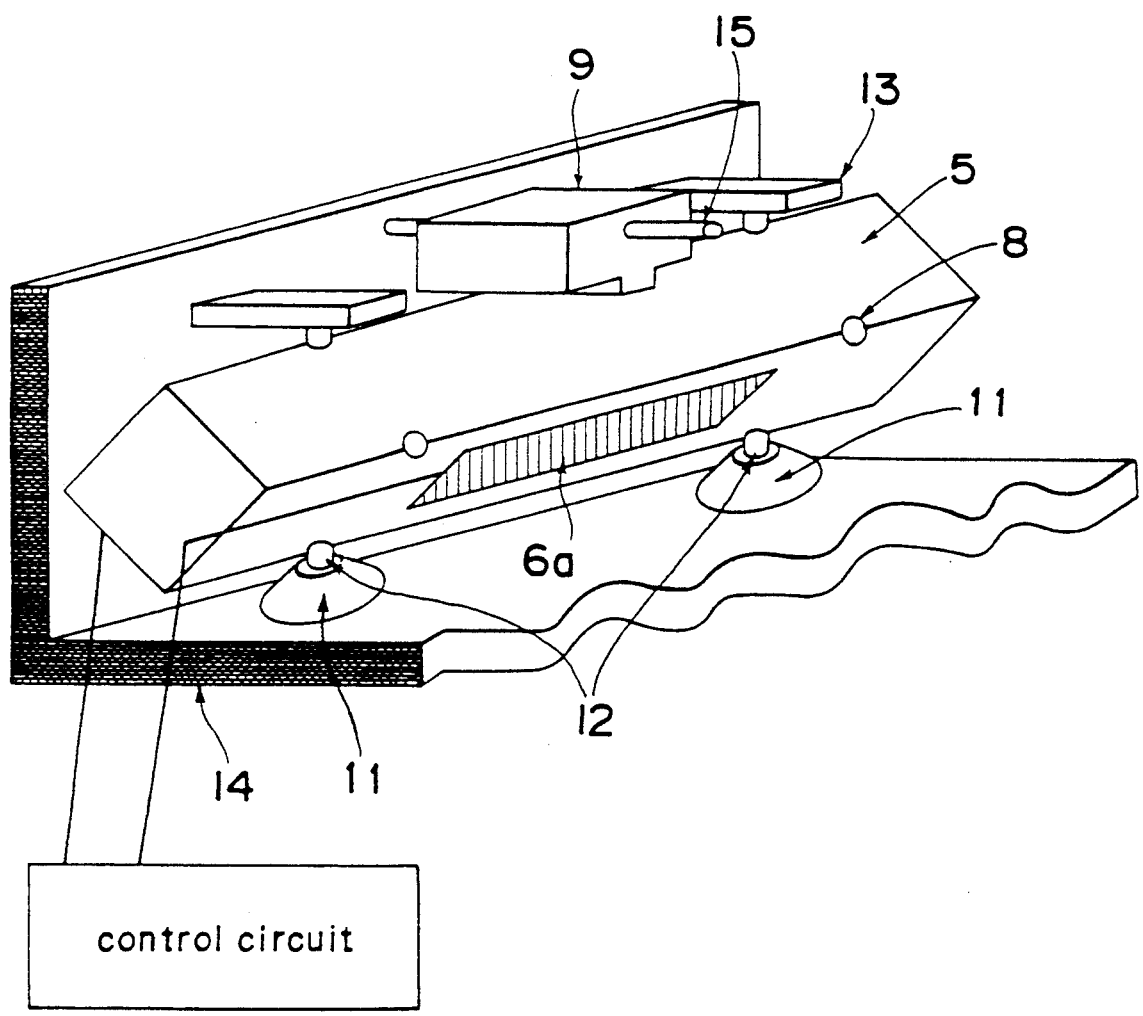
FIG. 4 is a perspective view showing the practical construction of a linear-type actuator in the first embodiment of the present invention.

FIG. 3 is a sectional view showing the construction of a liner-type actuator in the first embodiment of the present invention, while FIG. 4 is a perspective view showing the practical construction of the first embodimant. Referring now to the FIGS. 3 and 4, reference numeral 5 is a square elastic member in sectional shape made by ceramic, metal and the like, reference numeral 6a is a first piezo member, reference numeral 6b is a second piezo member. The first, second piezo members 6a, 6b are stuck on the elastic member 5 so as to constitute a vibrator 7. Reference numeral 8 is a support hole provided on the vibrator 7 at a position extremely adjacent to the node position of vibrating variation amount of the vibrator 7, and reference numeral 12 is a support member. The vibrator 7 is supported to be fixed at a position by inserting into the support hole 8 between a support member holder 13 and a support base 14. Reference numeral 9 is a moving member providing with an opening through which a guide shaft 15 is inserted to move the moving member 9 along the guide shaft 15. Reference number 11 is a spring for pressing the vibrator toward the moving member 9 in stable condition. Reference number 10 is a control circuit for controlling the driving of the vibrator 7. When the vibrator 7 is driven by the control circuit 10, the moving member 9 is moved along the guide shaft 15.

Figure 5:
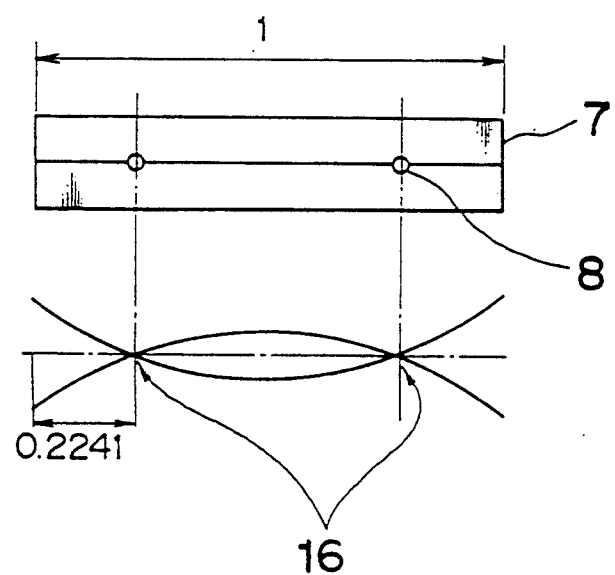
FIG. 5 is a view showing a primary free vibration displacement distribution of a driving member having a shape of rod.

FIG. 5 shows a side view of the displacement distribution of primary free vibration of the vibrator having a shape of rod, and a schematic view showing the variable distribution of amplitude of primary bending vibration to be excited onto the vibrator. Reference numeral 16 is a node of vibration wherein the amplitude becomes zero in corresponding to the position of the support member 12, and, if the support hole 8 of the vibrator 7 is adapted to correspond to this position of the node 16, the vibrator 7 is fixed at the position wherein the vibration loss becomes small. In the case of the vibrator having a shape of rod being actuated in bending vibration, the position of node is located at the position of 0.2241 from both the ends of the vibrator having a length of 1. Also, if the vibrator is supported at the support hole 8 by the support member 12 made of materials having a low Young's modulus or small sound speed such as a plastic, the vibrator can be mounted fixedly with a small loss of vibration. In this case, it is preferable to provide the support holes in symmetry so as to be equal the bending rigidity of the vibrator 7 in the both directions X and Y, but such a condition is not restricted in the case of the dimension of the support hole being small under neglecting the effect for the bending rigidity of the vibrator 7.

As the moving speed of the moving member 9 is proportioned to the vibrating amplitude, the moving member 9 is contact in pressing by the spring with either one of the ridge line portions of the vibrator 7 at the position close to the position having the maximum vibration amount between the pair of nodes 16 of the vibrator 7 as shown in FIG. 5. Accordingly, upon driving the vibrator 7, the moving member 9 is moved almost at the maximum speed along the guide shaft 15. From FIG. 3, the moving member 9 is in pressure contact in the ridge line portion of the vibrator 7 and in a maximum position of the vibration displacement amount of the central portion of the vibrator 7.

The vibrator 7 is composed of a material or the like, such as plastic pin or the like, which is low in Young's modulus or small in sound speed, and is fixed with a support hole 8. At this time, the support hole 8 is desired to be symmetrically provided so as to make equal the rigidity of the vibrator 7 in the X, Y directions, except for a case where the influence of the support hole 8 is negligible.

Figure 6A:
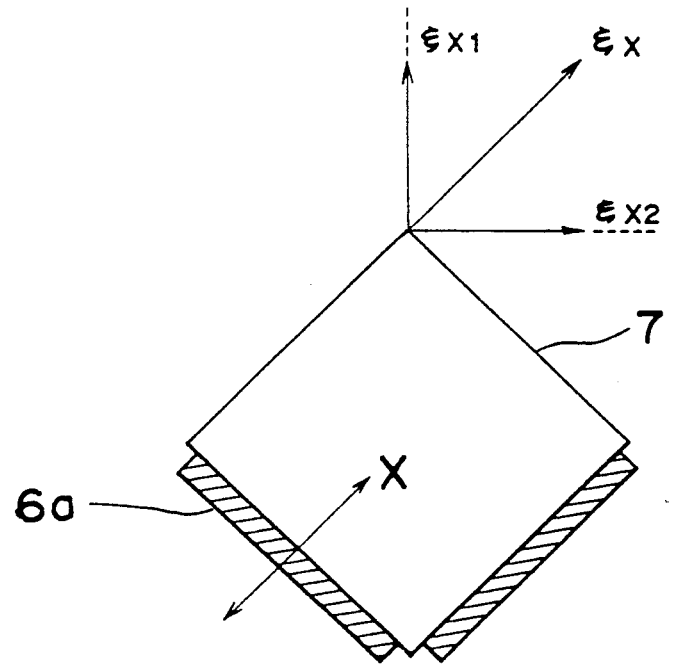
FIG. 6 (a) is a view for illustrating the operation principle in a first piezo member in the first embodiment of the present invention.
Figure 6B:
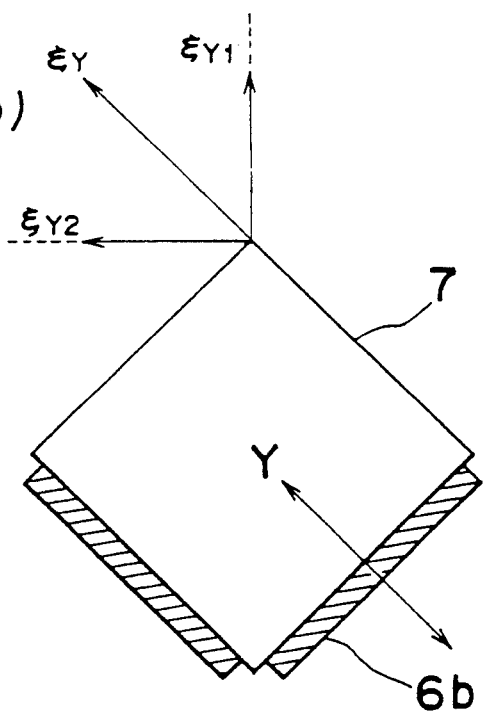

The driving principle will be described with the use of the operation illustrating views of FIG. 6 (a), (b). FIG. 6 (a) shows the vibrations of the ridge line portion of the vibrator 7 when the vibrations in the X direction have been excited by a first piezo member 6a. In the ridge line portion, the vibration displacement amount $\xi_x$ can be resolved into shift components in the $\xi_{x1}$ and $\xi_{x2}$ directions, the $=x1$ being the amount vertical to the moving direction of the vibrator 9, while the $=x2$ is the amount horizontal to the moving direction of the vibrator 9. Accordingly, the moving member 9 which has been brought into pressure contact against the ridge line portion is moved in the $\xi_{x2}$ direction of the guide shaft 15 by the $\xi_{x2}$ component of the vibration displacement $\xi_x$ excited by the first piezo member 6a.

Similarly, FIG. 6 (b) shows the vibrations of the ridge line portion of the vibrator 7 when the vibrations in the Y direction have been exited by the second piezo member 6b. In the ridge line portion, the vibration displacement amount $\xi_y$ can be resolved into components in the $\xi_{y1}$ and $\xi_{y2}$ directions. The moving member 9 which has been brought into pressure contact against the ridge line portion is moved in the $\xi_{y2}$ direction by the $\xi_{y2}$ component of the vibration displacement $\xi_y$ excited by the second piezo member 6b.

As the cosine direction components $\xi_{x2}$, $\xi_{y2}$ of the vibrations to be excited by the first, second piezo members 6a, 6b are components in the opposite direction, the moving direction of the moving member 9 can be controlled by the driving operation of either of the piezo members. One alternating current voltage is inputted by the switching operation into each piezo member to make it possible to effect an inverting operation of the moving direction.

According to the present embodiment, no restrictions of requirement with respect to mechanical working precision for the parallelism and plane accuracy between the moving member and the vibrator to be requested in the case of the plane of vibrator being contact with the plane of the moving member, are provided by the construction of bringing the moving member 9 into pressure contact of the moving member 9 against the ridge line portion of the moving member 7 so that a linear-type actuator which is lower in price, superior in mass production, and higher in reliability. As the moving direction of the moving member can be switched only by the driving operation of one piezo member at one time, the driving circuit and the control circuit can be made extremely simple in construction.

Further, as the same extent of vibration displacement amount can be obtained by the driving operation of one piezo member, the input power can be made less, and the driving efficiency can be considerably improved. Similarly, as the driving operation is effected only on the single side by the vibration of resonance frequency to be caused by one piezo member, the controlling operation can be effected, if the resonance frequencies are different in the X and Y directions, by shape change of the elastic member 5, the size accuracy and so on. The strict size accuracy and so on are not necessary. A liner type actuator stable in characteristics can be obtained by the exceedingly simple construction and driving circuit.

The first, second piezo members 6a, 6b are not restricted to only two orthogonal planes as shown in FIG. 3. Such piezo members 6a, 6b' are provided in arrangement of such polarization direction, as shown with an arrow mark in the drawing, on opposite planes as shown in FIG. 7. Low impedance seen from the driving terminal and high coupling coefficient expressing the extent of conversion between electric and mechanical are obtained by the driving operation with a set of the piezo member 6a, 6a' and the piezo members 6b, 6b', with advantages that the control circuit for following the driving frequency change with respect to the low voltage drive and the load variation can be simplified.

A second embodiment of the present invention will be described with reference to the drawings.

Figure 8:
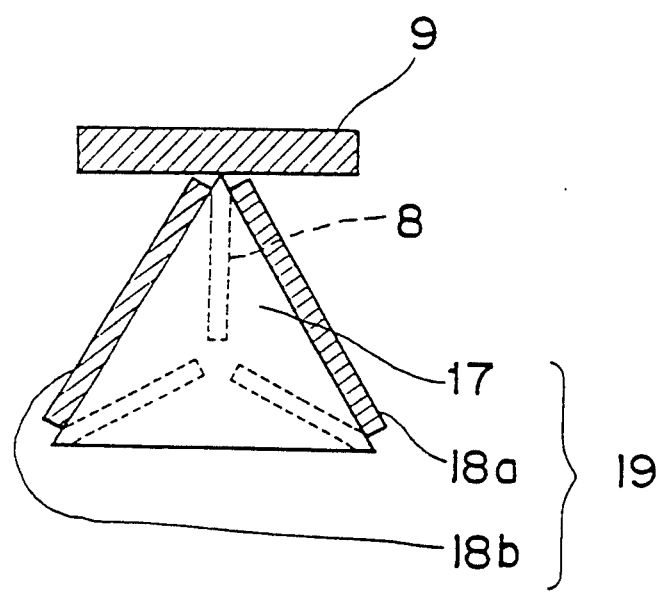
FIG. 8 is a sectional view showing the construction of a linear type actuator in a second embodiment of the present invention.

FIG. 8 is a sectional view showing the construction of a linear-type actuator in a second embodiment of the present invention. It is noted that the practical construction of linear type actuator can be realized by replacing the vibrator of the first embodiment shown in FIG. 4 to the vibrator of the second embodiment of FIG. 8. Referring now to FIG. 8, reference numeral 17 is an elastic member of triangular in sectional shape, reference numeral 18a is a first piezo member, reference numeral 18b is a second piezo member. The first, second piezo members 18a, 18b are stuck on the oblique plane of the elastic member 17 so as to constitute a vibrator 19. The moving member 9 to be moved along the guide shaft 15 is in pressure contact by the pressing spring 11 against the ridge line portion of the triangular elastic member 17 grasped with the first, second piezo members 18a, 18b. As the displacement distribution of the primary free vibrations of the rod of a triangular section is similar to that of FIG. 5 with providing the node at the position of 0.2241 from the both ends of the vibrator 19, the support fixing operation can be effected with a node 16 of the vibration as in the first embodiment so that the vibrator 7 can be supported by the support holder 13 and support base 14 through the support member at the node position 16 of vibration.

Figure 9A:
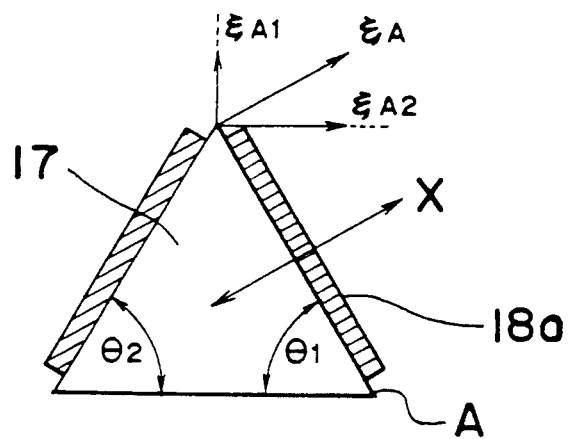
FIG. 9 (a) is a view for illustrating the operation principle in a first piezo member in the second embodiment of the present invention.
Figure 9B:
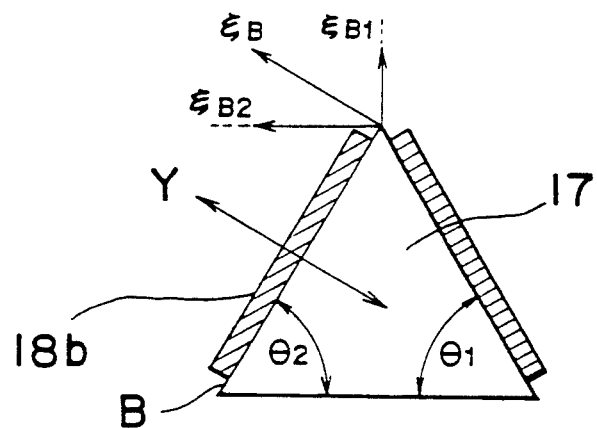

The operation principle will be described hereinafter with the use of FIG. 9 (a), (b). Basically it is similar to the above described first embodiment. FIG. 9 (a) shows the vibrations of the ridge line portion of the vibrator 19 with the vibrations in the normal direction of the oblique side A being excited with the first piezo member 18a. In the ridge line portion, the vibration displacement amount $\xi_A$ can be resolved into components in the $\xi_{A1}$ and $\xi_{A2}$ directions. The moving member 9 (not shown) which has been brought into pressure contact against the ridge line portion is moved in the $\xi_{A2}$ direction by the $\xi_{A2}$ component of the vibration displacement $\xi_A$ excited by the first piezo member 18a. Likewise, FIG. 9 (b) shows the vibrations of the ridge portion of the vibrator 19 when the vibrations in the normal direction of the oblique side B have been excited by the second piezo member 18b. In the ridge line portion, the vibration displacement amount $\xi_B$ can be resolved into components in the $\xi_{B1}$ and $\xi_{B2}$ directions. The moving member 9 (not shown) which has been brought into pressure contact against the ridge line portion is moved in the $\xi_{B2}$ direction by the $\xi_{B2}$ of the vibration displacement $\xi_B$ excited by the second piezo member 18b.

As the cosine direction components $\xi_{A2}$, $\xi_{B2}$ of the vibrations to be excited by the first, second piezo members 18a, 18b are components in the opposite direction, the moving direction of the moving member 9 can be controlled by the driving operation of either of the piezo members. One alternating current voltage is inputted by the switching operation of one alternating voltage into each piezo member to move the moving member 9 in reverse direction.

According to the second embodiment, the same effect as in the first embodiment can be obtained to realize a linear type actuator having high efficiency in simple construction.

In the present invention, the resonance frequency has no problems if a shear is caused in the vibrations in the X, Y directions. In order to shorten the control time for sweeping the frequency, both the resonance frequencies are desired to be conformed. In the square sectional vibrator, the resonance frequency cannot be adjusted independently as the piezo coupling operation is effected in the X, Y directions. As the influences are applied upon each other, it is extremely difficult to effect. But in the triangular sectional vibrator, the piezo coupling is small. The resonance frequency can be easily adjusted with, for example, planing off of the corners of the opposite ridge line portion on each side.

When an angle grasped between the oblique side and the bottom side is made $\theta$ as shown in FIG. 9, $\xi_{A2}$, $\xi_{B2}$ are expressed with the (4) equation and the (5) equation.

$$\xi_A = \xi_{A2} X \cos(\pi/2 - \theta) \tag{4}$$

$$\xi_B = \xi_{B2} X \cos(\pi/2 - \theta) \tag{5}$$

At this time, assume that the vibrator is an equilateral triangle, $\xi_{A2}$, $\xi_{B2}$ are approximately 87% of $\xi_A$, $\xi_B$ at $\theta = 60$ degrees, larger amplitude can be obtained as compared with approximately 71% at the $\theta = 45$ degrees of the square. Accordingly, a linear-type actuator capable of high efficiency driving operation can be obtained.

The shape of the triangle of the vibrator is desired to be an equilateral triangle or an isosceles triangle, but it is not restricted to such a shape in the case of the pair of impedances or resonance frequencies taken from the pair of driving terminals being not equal to each other.

A third embodiment of the -present invention will be described in detail in accordance with FIGS. 10 to 12.

Figure 10A:
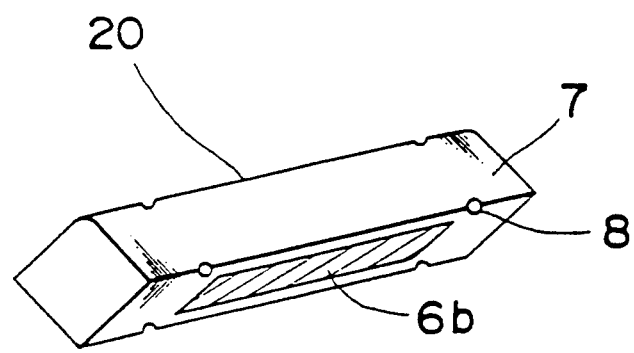
FIGS. 10(a) and 10(b) are sectional views showing the construction of a vibrator employed in a linear type actuator in a third embodiment of the present invention.
Figure 10B:
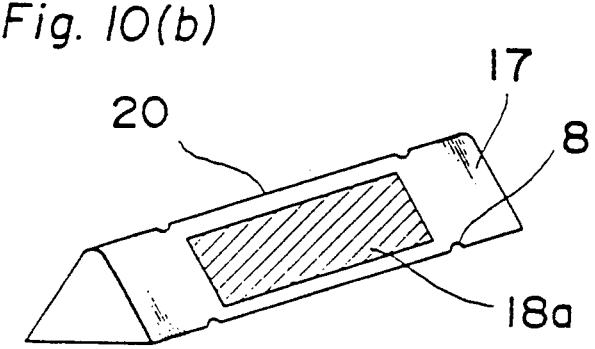
Figure 11A:
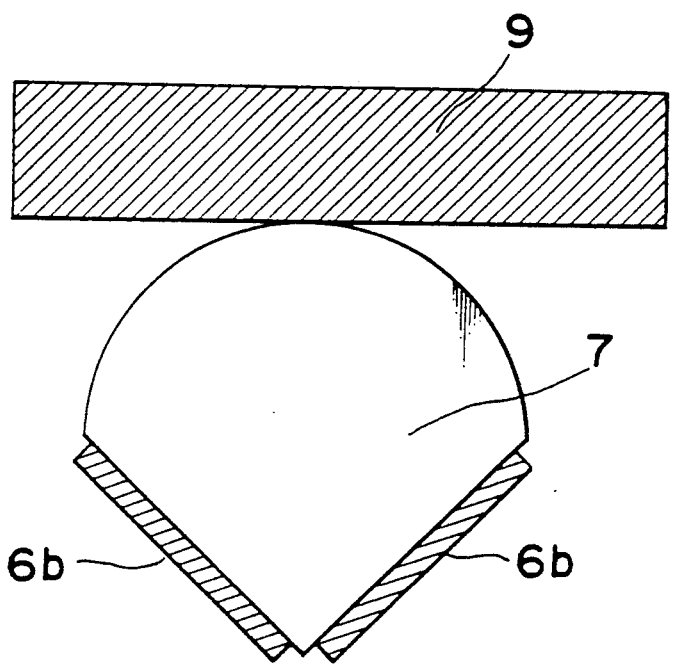
FIGS. 11(a) and 11(b) are sectional views showing one example of the configuration of the vibrator employed in the present invention.
Figure 11B:
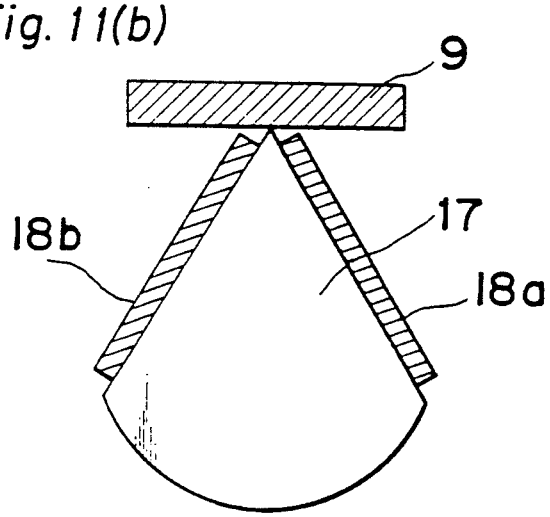
Figure 12A:
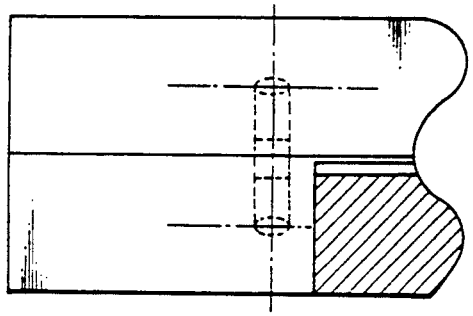
FIGS. 12(a) to 12(f) are sectional views of the vibrator showing one example of a supporting member employed in the present invention.
Figure 12B:
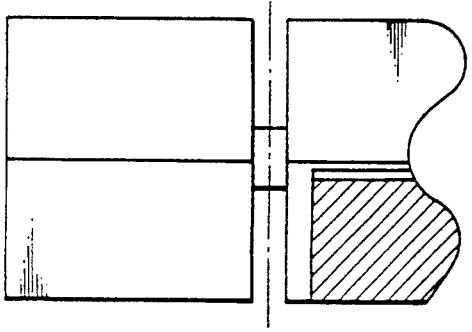
Figure 12C:
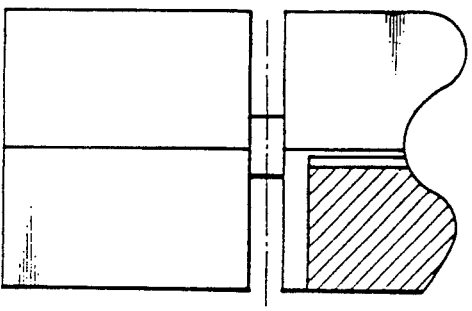
Figure 12D:
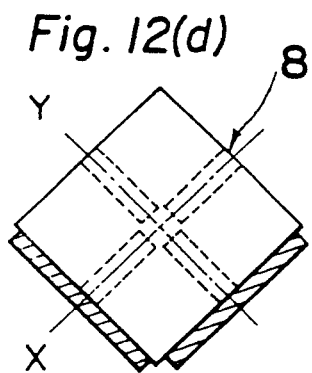
Figure 12E:
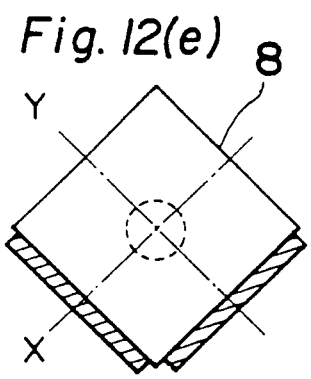
Figure 12F:
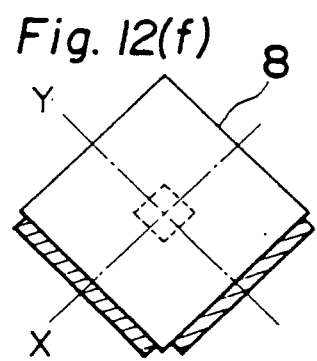

The present embodiment is a linear-type actuator with roundness 14 being formed at least at the rigid line portion contacting with moving member to remove the edges, as shown in the sectional view of the vibrator of FIG. 10, on the ridge line portion where at least a moving member 9 of the vibrators 9 and 17 coming into pressure contact with it in the construction of each of the above described embodiments. The other construction is similar to the above described embodiment.

As the abrasion of the moving member 9 through the poking out operation, with the edges of the vibrator, to be caused at the driving operation in each of the above described embodiments is extremely reduced, the life of the line-type actuator is considerably improved, the actuator high in reliability can be obtained for a long period, thus resulting in incalculable values in industry.

Although the sectional shape of the vibrator is made quadrangular or triangular in the above described first and second embodiment, it is needless to say that it may be made a polygon. The shape may be made circular as shown in FIG. 10 except for the sticking face of the piezo member.

The support hole 8 may be shaped so that the size may be reduced and worked with a node and its vicinity being made round or the same in shape as the vibrator as shown in FIG. 12 (b), (c) if it is provided on each ridge and each plane at an extent a hole does not penetrate from a diagonal line direction or X, Y axis directions of the vibrator 7, 17 shown in the embodiment of the present invention when it can be fixedly supported in the central portion and its vicinity which is the position of the node 16 of the vibrator 7, 17 as shown in FIG. 12 (a). FIG. 12 shows a quadrangle vibrator, and needless to say, the other shape can be applied.

The present invention can realize a linear-type actuator which is low at cost, superior in mass production, stable in characteristics as the present invention can be free from restriction with respect to the plane accuracy and parallel degree by the driving operation with the moving member being in pressure contact against the ridge line portion of the vibrator having the quadrangular and triangular sections.

The moving member can be driven in one direction with a cosine direction component of the vibration displacement to be excited by the alternating current voltage applied upon the single piezo member by the driving operation in the ridge line portion of the vibrator. By the switching operation of the alternating voltage upon the other piezo member to apply it, the moving direction of the moving member can be inverted, so that a linear-type actuator which is high in efficiency and is extremely high in using value in industry because of the low input driving operation.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A linear actuator comprising: a vibrator including a rod-shaped elastic member having a square sectional shape, and first and second piezoelectric members disposed on at least a set of planar surfaces of the elastic member which surfaces are orthogonal to each other; a moving member in contact with the vibrator at only a ridge of a corner of the vibrator where orthogonal planar surfaces of the elastic member intersect; and a control circuit which selectively applies an alternating current voltage to said first and second piezoelectric members; said moving member being supported so as to be movable in one direction by vibrations excited by the vibrator when an alternating current voltage is applied by said control circuit to said first piezoelectric member, and so as to be movable in another direction opposite to said one direction by vibrations excited by the vibrator when an alternating current voltage is applied by said control circuit to said second piezoelectric member.

2. The linear actuator as claimed in claim 1, wherein said elastic member has a round defining said ridge in contact with said moving member.

3. The linear actuator as claimed in claim 1, and further comprising at least one spring biasing said vibrator into contact with said moving member.

4. A linear actuator comprising a vibrator including a rod-shaped elastic member having a triangular sectional shape, and first and second piezoelectric members disposed on two planar surfaces of the elastic member extending obliquely to one another; a moving member in contact with the vibrator at only a ridge of a corner of the vibrator where said planar surfaces intersect; and a control circuit which selectively applies an alternating current voltage to said first and second piezoelectric members; said moving member being supported so as to be movable in one direction by vibrations excited by the vibrator when an alternating current voltage is applied by said control circuit to said first piezoelectric member, and so as to be movable in another direction opposite to said one direction by vibrations excited by the vibrator when an alternating current voltage is applied by said control circuit to said second piezoelectric member.

5. The linear actuator as claimed in claim 4, wherein said elastic member has a round defining said ridge in contact with said moving member.

6. The linear actuator as claimed in claim 4, and further comprising at least one spring biasing said vibrator into contact with said moving member.

7. A linear actuator comprising: a vibrator including a rod-shaped elastic member having a polygonal sectional shape, and first and second piezoelectric members disposed on two planar surfaces of the elastic member extending obliquely to one another; a moving member in contact with the vibrator at only a ridge of a corner of the vibrator, where said planar surfaces intersect; and a control circuit which selectively applies an alternating current voltage to said first and second piezoelectric members; said moving member being supported so as to be movable in one direction by vibrations excited by the vibrator when an alternating current voltage is applied by said control circuit to said first piezoelectric member, and so as to be movable in another direction opposite to said one direction by vibrations excited by the vibrator when an alternating current voltage is applied by said control circuit to said second piezoelectric member.

8. The linear actuator as claimed in claim 7, wherein said elastic member has a round defining said ridge in contact with said moving member.

9. The linear actuator as claimed in claim 7, and further comprising at least one spring biasing said vibrator into contact with said moving member.

* * * * *